United States Patent
Sharma

(10) Patent No.: US 11,927,766 B2
(45) Date of Patent: Mar. 12, 2024

(54) IN-FIELD IMAGING SYSTEM FOR EYE TRACKING

(71) Applicant: Meta Platforms Technologies, LLC, Menlo Park, CA (US)

(72) Inventor: Robin Sharma, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/709,690

(22) Filed: Mar. 31, 2022

(65) Prior Publication Data
US 2023/0134442 A1  May 4, 2023

Related U.S. Application Data

(60) Provisional application No. 63/273,481, filed on Oct. 29, 2021.

(51) Int. Cl.
| | |
|---|---|
| *G02B 27/01* | (2006.01) |
| *G06F 3/01* | (2006.01) |
| *G06T 7/70* | (2017.01) |
| *H04N 23/54* | (2023.01) |
| *H04N 23/55* | (2023.01) |
| *H04N 23/56* | (2023.01) |
| *H04N 23/57* | (2023.01) |

(52) U.S. Cl.
CPC ..... *G02B 27/0179* (2013.01); *G02B 27/0172* (2013.01); *G06F 3/013* (2013.01); *G06T 7/70* (2017.01); *H04N 23/54* (2023.01); *H04N 23/55* (2023.01); *H04N 23/56* (2023.01); *H04N 23/57* (2023.01); *G02B 2027/0138* (2013.01); *G02B 2027/0178* (2013.01); *G02B 2027/0187* (2013.01); *G06T 2207/10048* (2013.01); *G06T 2207/30201* (2013.01)

(58) Field of Classification Search
CPC ............ G02B 27/0179; G02B 27/0172; G02B 2027/0138; G02B 2027/0178; G02B 2027/0187; G06F 3/013; G06T 7/70; G06T 2207/10048; G06T 2207/30201; H04N 23/54; H04N 23/55; H04N 23/56; H04N 23/57
See application file for complete search history.

(56) References Cited

U.S. PATENT DOCUMENTS

| | | | | |
|---|---|---|---|---|
| 9,285,872 | B1* | 3/2016 | Raffle | ............... G06F 3/012 |
| 10,674,912 | B1* | 6/2020 | Vaziri | ............... H04N 23/45 |
| 2020/0174252 | A1* | 6/2020 | Lamkin | ............... G06F 3/013 |

* cited by examiner

*Primary Examiner* — Nasim N Nirjhar
(74) *Attorney, Agent, or Firm* — FREESTONE INTELLECTUAL PROPERTY LAW PLLC; Aaron J. Visbeek; William J. Pigott

(57) ABSTRACT

An apparatus, system, and method for an imaging system that may be used to support eye tracking in a head mounted display. The imaging system may include an image sensor positioned in a user's field of view and within a lens assembly to capture light that is reflected from an eye. The imaging system may include two optical elements that are configured to at least partially direct scene light around the image sensor to conceal the image sensor from the user's eye. The image sensor is positioned between the two optical elements within the lens assembly.

16 Claims, 7 Drawing Sheets

IN-FIELD IMAGING SYSTEM FOR EYE TRACKING

CROSS-REFERENCE TO RELATED APPLICATIONS

This application claims priority to U.S. Provisional Application No. 63/273,481 filed Oct. 29, 2021, which is hereby incorporated by reference.

TECHNICAL FIELD

This disclosure relates generally to optics, and in particular to eye tracking technologies.

BACKGROUND INFORMATION

Eye tracking technology enables head mounted displays (HMD) to interact with users based on the users' eye movement or eye orientation. Existing eye tracking systems use cameras that are positioned on a frame of the HMD. However, having a camera on a frame of an HMD makes imaging susceptible to occlusions from eyelashes and eyelids.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
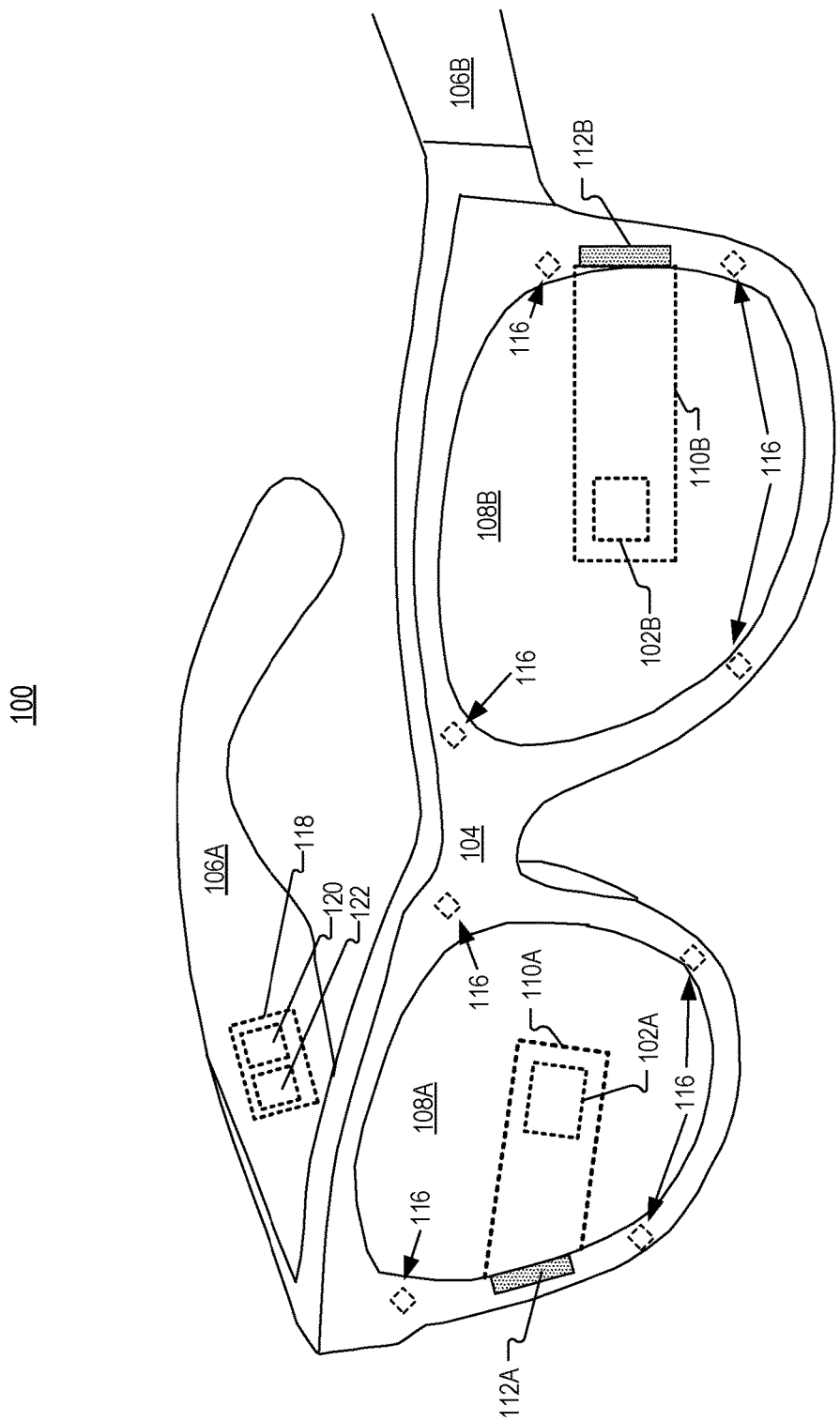
FIG. 1 illustrates a head mounted display, in accordance with aspects of the disclosure.

Embodiments of an in-field imaging system having a cloaking optical structure are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm to 700 nm. Non-visible light may be defined as light having wavelengths that are outside the visible light range, such as ultraviolet light and infrared light. In aspects of this disclosure, red light may be defined as having a wavelength range of approximately 620 to 750 nm, green light may be defined as having a wavelength range of approximately 495 to 570 nm, and blue light may be defined as having a wavelength range of approximately 450 to 495 nm.

Eye tracking functionality expands the services and quality of interaction that head mounted displays (HMDs) can provide to users. Eyelashes and eyelids can block and inhibit the quality of signal (e.g., image) available from eyes when cameras are placed on a frame of an HMD. A significantly better position for imaging an eye is with a camera located in front of the eye. However, placing a camera right in front of an eye could obstruct the vision of a user and could be an annoyance that reduces the quality of a user's experience with the HMD. Disclosed herein are techniques for both placing an image sensor in the field of view of a user's eye and for concealing or cloaking the image sensor from the user's vision. In aspects of the disclosure, "in-field" can be defined as being in the field of view of a user's eye(s).

An HMD may include an imaging system that is at least partially disposed in a lens assembly of the HMD to receive reflections from a user's eye. The imaging system includes an image sensor and an optical structure. The optical structure is configured to direct scene light around the image sensor to enable distraction-free and in-field imaging of a user's eye. In other words, the optical structure is configured to conceal or cloak the image sensor from the user's eye by directing scene light around the image sensor to the user's eye. The optical structure also directs reflections (e.g., infrared reflections) from the user's eye to the image sensor, while the image sensor is positioned in-field of the user's eye.

The optical structure includes an out-coupling (eye-side) optical element, an in-coupling (scene-side) optical element, and one or more intermediate optical elements. The in-coupling optical element receives scene light and directs the scene light to the one or more intermediate optical elements. The one or more intermediate optical elements receive the scene light from the in-coupling optical element and direct the scene light to the out-coupling optical element. The out-coupling optical element receives the scene light from the one or more intermediate optical elements and directs the scene light to the user's eye. The out-coupling optical element may be configured to reflect or diffract visible light to the eye and transmit or pass non-visible light (e.g., near infrared light) from the eye to the image sensor. The out-coupling optical element and the in-coupling optical element may be dichroic mirrors, optical prisms, holographic optical elements, and/or gratings that are configured to redirect visible light while transmitting or passing non-visible light. The disclosed concealing or cloaking of the image sensor by redirecting visible light around the image sensor may result in a distraction-free and unobstructed imaging of the user's eye.

The image sensor is positioned between the in-coupling optical element and the out-coupling optical element to enable the optical elements to mask, cloak, or otherwise hide the image sensor from the user's eye (and from outside observers). The image sensor may have dimensions of 500 µm by 500 µm by 500 µm, for example.

The optical structure is a cloaking device that is at least partially integrated into a lens assembly of the HMD. The lens assembly may include one, two, three, or more optical layers. The various components of the imaging system may be incorporated into one or more optical layers and frame of the HMD, according to various embodiments.

The HMD may include more than one optical cloaking device for each eye of a user. For example, the HMD may include two optical cloaking devices for each eye of the user. One optical cloaking device may have an image sensor that is oriented towards the eyebox to capture eye reflection light. Another optical cloaking device may have an image sensor that is oriented outwards (away from the eyebox) to capture (or at least partially capture) scene light from a perspective of the user of the HMD. For an outward-oriented image sensor, the in-coupling (scene-side) optical element may include a beam splitter that partially directs visible light to the image sensor and that substantially directs (e.g., reflects, refracts, or diffracts) the remaining visible light towards the one or more intermediate optical elements (e.g., mirrors) and to the user's eye. Image data representing scene light can be used to identify objects in a scene, provide user interface options/menus, and reduce the size of the HMD frames by including electronics in the lens assembly (rather than in the HMD frame), to enable fabrication of lower-profile HMD frames.

The apparatus, system, and method for an in-field imaging system with a cloaking optical structure is described in this disclosure and enables improvements in eye tracking technologies, for example, to support operations of an HMD. These and other embodiments are described in more detail in connection with FIGS. 1-7.

FIG. 1 illustrates a head mounted display (HMD) 100, in accordance with aspects of the present disclosure. As described further below, in embodiments, HMD 100 may include an imaging system 102A/102B that receives reflections from an eye in the field of vision (in-field) of a user's eye. Imaging system 102A/102B may be used to support eye tracking, user experience (UX), and other features of HMD 100. An HMD, such as HMD 100, is one type of head mounted display, typically worn on the head of a user to provide artificial reality content to the user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

HMD 100 includes frame 104 coupled to arms 106A and 106B. Each lens assembly 108A/108B is mounted to frame 104. Each lens assembly 108A/108B may be a prescription lens matched to a particular user of HMD 100 or may be non-prescription lens. The illustrated HMD 100 is configured to be worn on or about a head of a wearer of HMD 100.

Each lens assembly 108A/108B includes a waveguide 110A/110B to direct image light generated by a display 112A/112B to an eyebox area for viewing by a user of HMD 100. Display 112A/112B may include a liquid crystal display (LCD), an organic light emitting diode (OLED) display, micro-LED display, quantum dot display, pico-projector, or liquid crystal on silicon (LCOS) display for directing image light to a wearer of HMD 100.

Lens assemblies 108 (individually, lens assembly 108A and lens assembly 108B) may appear transparent to a user to facilitate augmented reality or mixed reality to enable a user to view scene light from the environment around her while also receiving image light directed to her eye(s) by, for example, waveguides 110 (individually, waveguide 110A and waveguide 110B). Consequently, lens assemblies 108 may be considered (or include) an optical combiner. Each lens assembly 108A/108B may include a lens assembly that includes two or more optical layers that carry portions of imaging system 102A/102B and/or waveguide 110A/110B, in an embodiment. In some embodiments, display light from display 112A or 112B is only directed into one eye of the wearer of HIVID 100. In an embodiment, both displays 112A and 112B are used to direct image light into waveguides 110A and 110B, respectively.

HMD 100 includes a number of light sources 116 disposed around a periphery of lens assemblies 108 in frame 104. Light sources 116 emit light in an eyeward direction to illuminate an eyebox of HMD 100 to generate reflections from an eye (or eyes) of a wearer of HMD 100. Light sources 116 may be light emitting diodes (LEDs), vertical-cavity surface-emitting lasers (VCSELs), micro light emitting diode (micro-LED), an edge emitting LED, a superluminescent diode (SLED), or another type of light source. Light sources 116 emit non-visible light, according to an embodiment. Light sources 116 emit near infrared light (e.g., 750 nm-1.5 µm), according to an embodiment. In one embodiment, light emitted from light sources 116 is infrared light centered around 850 nm. Infrared light from other sources may illuminate the eye as well.

Reflected light from light sources 116 is reflected off of a user's eye and is received by imaging system 102A/102B, according to an embodiment. Imaging systems 102 (individually, imaging system 102A and imaging system 102B) are positioned within lens assemblies 108A/108B to be in-field of the user's eye. Imaging system 102A/102B includes an image sensor and an (cloaking) optical structure, according to an embodiment. The image sensor positioned in-field may provide improved eye orientation determination (e.g., eye tracking) over traditional configurations. The optical structure is configured to conceal the image sensor from the user's eye by directing scene light and/or display light around the image sensor and by directing reflected light to the image sensor. Imaging system 102A/102B is depicted as imaging system 102A in lens assembly 108A and as imaging system 102B in lens assembly 108B. However, the disclosed imaging system may be implemented in only one of lens assemblies 108A/108B, according to one embodiment.

Frame 104 and arms 106 (individually, arm106A and arm106B) may include supporting hardware of HIVID 100. HMD 100 may include a controller 118 to receive image data from imaging system 102A/102B and to determine an orientation of a user's eye, based on the image data, according to an embodiment. Controller 118 may include processing logic 120, wired and/or wireless data interface for sending and receiving data, graphic processors, and one or more memories 122 for storing data and computer-executable instructions. Controller 118 and/or processing logic 120 may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HIVID 100 may be configured to receive wired data including video data via a wired communication channel. In one embodiment, HMD 100 is configured to receive wireless data including video data via a wireless communication channel.

Figure 2:
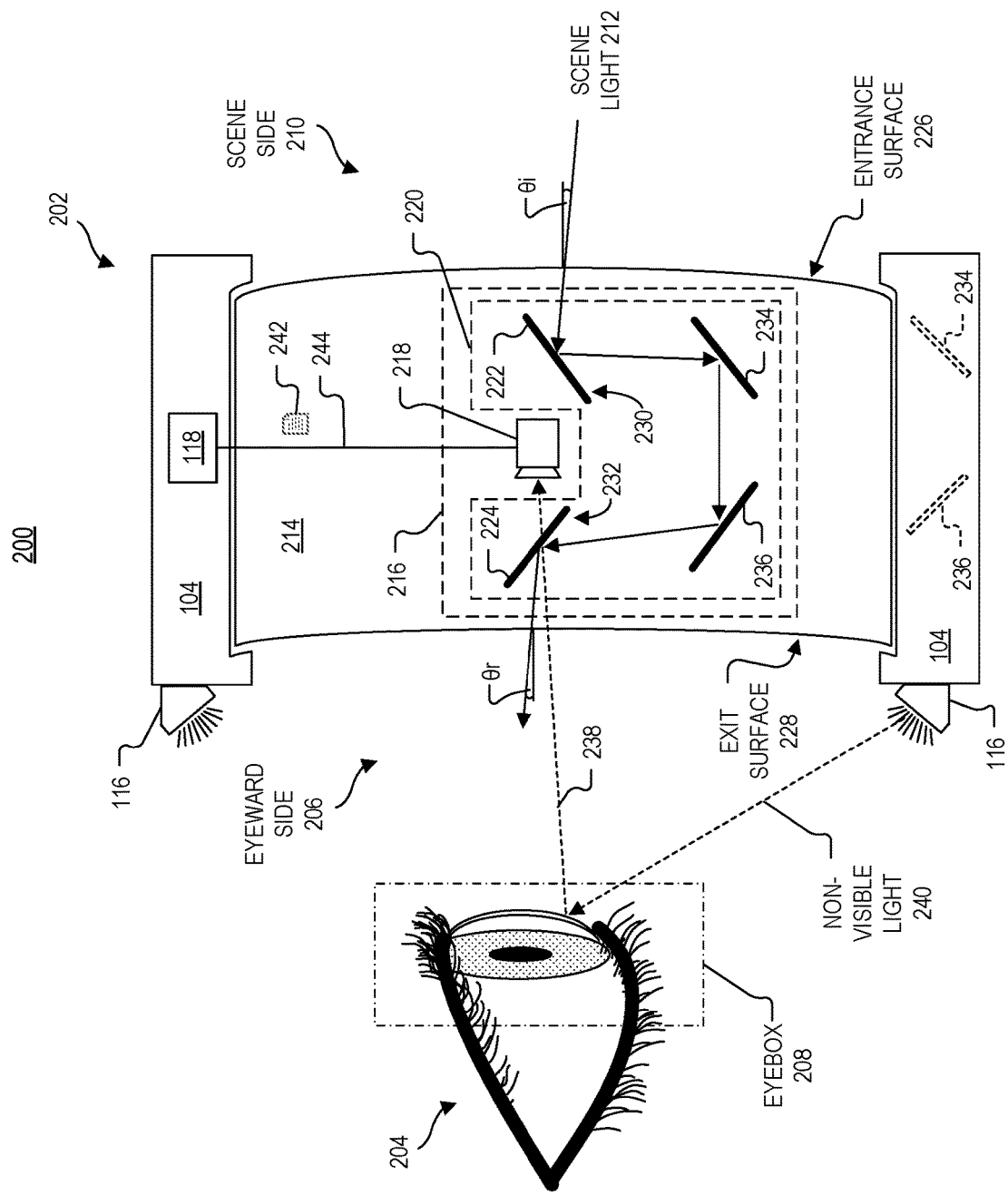
FIG. 2 illustrates an example implementation of a head mounted display in an ocular environment, in accordance with aspects of the disclosure.

FIG. 2 illustrates an ocular environment 200, according to an embodiment of the disclosure. Ocular environment 200 includes a cross-sectional side view of an HMD 202 positioned near an eye 204 of a user. HMD 202 is an example implementation of HMD 100 (shown in FIG. 1), according to an embodiment.

HMD 202 includes an eyeward side 206 and a scene side 210. Eyeward side 206 is where an eyebox 208 is located and where eye 204 is located during use. Eyebox 208 is a two or three dimensional area in which eye 204 may move within. HMD 202 may be configured to direct scene light and/or display light into eyebox 208. Scene side 210 is the side of HMD 202 from which scene light 212 is generated and enters a lens assembly 214 of HMD 202. Lens assembly 214 is an example implementation of lens assembly 108A (shown in FIG. 1).

Lens assembly 214 is configured to direct scene light 212 from scene side 210 to eyeward side 206. Lens assembly 214 may be implemented as a single optical layer (e.g., lens, plastic, glass) or may include a number of optical layers optically coupled together (e.g., stacked) and configured to support operation of HMD 202. For example, lens assembly 214 may include one optical layer that is configured to focus scene light 212 on eyebox 208 and may have another optical layer configured to provide display light to eyebox 208. Other layers may have other functions, as disclosed further below.

Lens assembly 214 includes an imaging system 216 that is positioned in-field of eye 204. Imaging system 216 is an example implementation of imaging system 102A (shown in FIG. 1). Imaging system 216 is configured to provide scene light 212 to eyebox 208 and to receive reflections (e.g., infrared reflections) off of eye 204. Imaging system 216 includes an image sensor 218 and an optical structure 220 that is configured to cloak or conceal image sensor 218 from eye 204. Optical structure 220 conceals image sensor 218 from eye 204 by directing scene light 212 around image sensor 218. By directing a portion of scene light 212 around image sensor 218, eye 204 may see or receive portions of scene light 212 that may have been blocked or obstructed by image sensor 218. In other words, optical structure 220 enables eye 204 to see scene side 210 of image sensor 218 without recognizing or perceiving the obstruction of image sensor 218. In the absence of optical structure 220, image sensor 218 may appear as a dot or obstruction in a user's field of view and may reduce the overall enjoyability of the user's experience while interacting with HMD 202.

Optical structure 220 includes an in-coupling optical element 222 and an out-coupling optical element 224, according to an embodiment. Image sensor 218 is positioned between in-coupling optical element 222 and out-coupling optical element 224. In-coupling optical element 222 and out-coupling optical element 224 are disposed within lens assembly 214, according to an embodiment. In-coupling optical element 222 is disposed near (e.g., almost touching) an entrance surface 226 of lens assembly 214, and out-coupling optical element 224 is disposed near an exit surface 228 of lens assembly 214, according to an embodiment. In-coupling optical element 222 includes a reflective surface 230. Reflective surface 230 is configured to reflect visible light, according to an embodiment. Out-coupling optical element 224 includes a reflective surface 232. Reflective surface 232 is configured to reflect visible light and transmit infrared light, according to an embodiment. Reflective surfaces 230 and/or 232 may be coated to selectively reflect visible light and transmit or pass non-visible light and may include a dichroic coating to enable this functionality.

Optical structure 220 may include one or more intermediate optical elements that optically couple in-coupling optical element 222 to out-coupling optical element 224. Optical structure 220 includes intermediate optical element 234 and intermediate optical element 236, according to an embodiment. Intermediate optical element 234 is positioned within lens assembly 214 to receive scene light 212 from in-coupling optical element 222 and to direct (e.g., reflect) scene light 212 to intermediate optical element 236. Intermediate optical element 236 is positioned within lens assembly 214 to receive scene light 212 from intermediate optical element 234 and to direct (e.g., reflect) scene light 212 to out-coupling optical element 224. As illustrated, intermediate optical elements 234 and 236 may optionally be positioned in frame 104 or near the outer portion of the field of view of eye 204 within lens assembly 214.

Optical structure 220 defines an optical path that directs (a portion of) scene light 212 around image sensor 218 to conceal or cloak image sensor 218 from eye 204. The optical path includes scene light 212: entrance into lens assembly 214 through entrance surface 226 (with an incident angle $\theta i$) to in-coupling optical element 222; redirection from in-coupling optical element 222 to intermediate optical element 234; redirection from intermediate optical element 234 to intermediate optical element 236; redirection from intermediate optical element 236 to out-coupling optical element 224; and redirection from out-coupling optical element 224 to exit surface 228 towards eye 204. In one embodiment, scene light 212 exits lens assembly 214 with a refraction angle $\theta r$ that is similar to incident angle $\theta i$. In other embodiments, lens assembly 214 includes positive power or negative power that changes refraction angle $\theta r$ to be more convergent or divergent than incident angle $\theta i$.

Image sensor 218 is positioned within lens assembly 214 to receive reflections from eye 204 through at least part of optical structure 220. Image sensor 218 may be used to support eye tracking functions of HMD 202 by receiving reflections 238 of non-visible light 240 (e.g., infrared, near-infrared, etc.) off of eye 204. Non-visible light 240 may be emitted by one or more light sources 116 that may be positioned in various locations on frame 104. Image sensor 218 may receive reflections 238 through out-coupling optical element 224, which may be configured to reflect visible light and transmit or pass non-visible light 240. In other words, out-coupling optical element 224 may be configured to direct scene light 212 to eye 204 and may be configured to direct reflections 238 off of eye 204 to image sensor 218. Image sensor 218 converts reflections 238 into image data 242. Image data 242 includes data that may be representative of the conversion of reflections 238 into electrical signals by image sensor 218. Image sensor 218 may be communicatively coupled to controller 118 through communications channel 244 and may use communications channel 244 to provide image data 242 to controller 118. Image sensor 218 may be implemented as a complementary metal oxide semiconductor ("CMOS") image sensor or a charge-coupled device ("CCD") image sensor.

Figure 3:
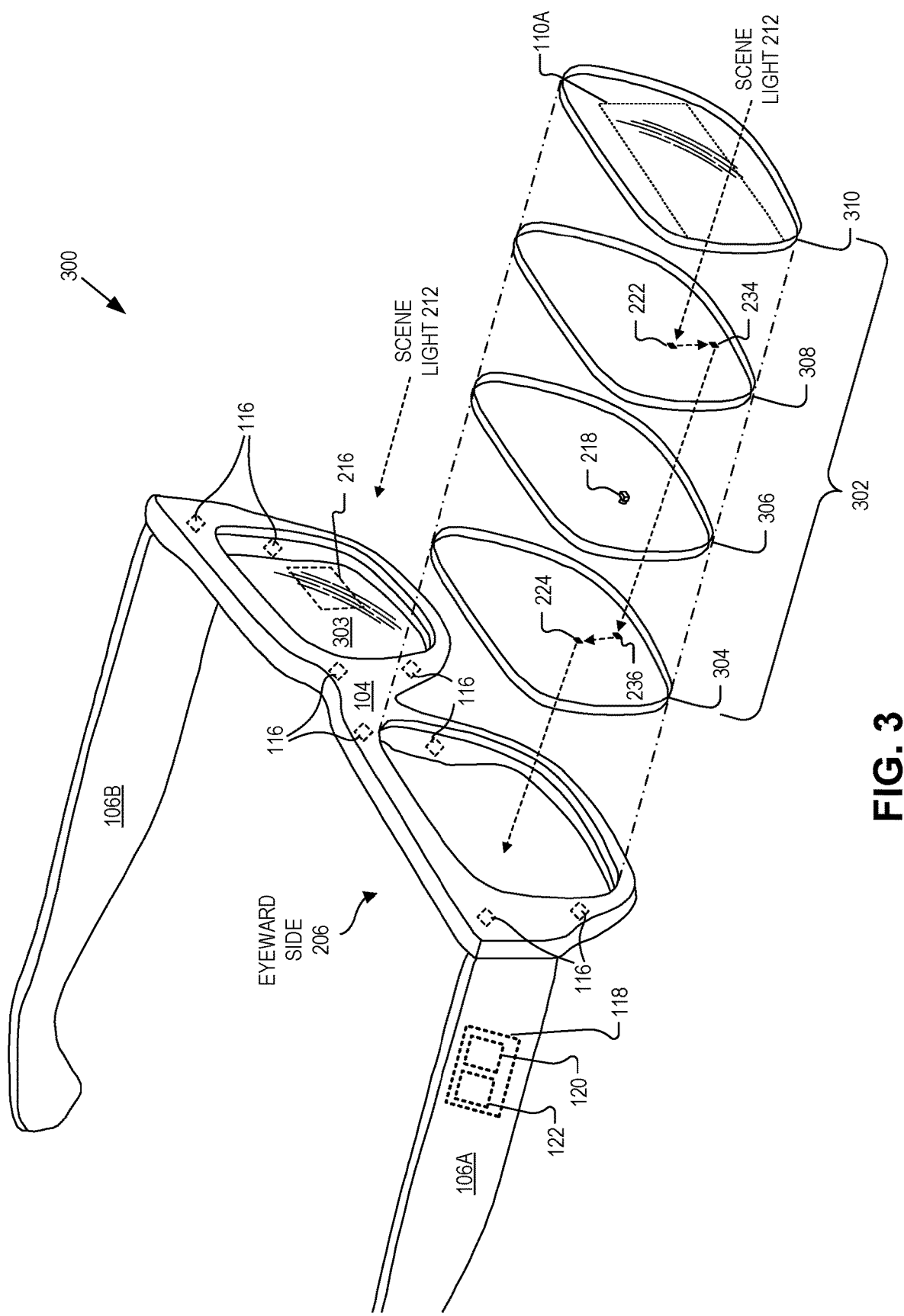
FIG. 3 illustrates a head mounted display, in accordance with aspects of the disclosure.

FIG. 3 illustrates a partially exploded perspective view of an HMD 300, in accordance with embodiments of the disclosure. HMD 300 illustrates an example implementation of HMD 202 (shown in FIG. 2), according to an embodiment. HMD 300 includes a lens assembly 302 and a lens assembly 303. Lens assembly 302 is an illustrative example of an implementation of lens assembly 214 (shown in FIG. 2). Lens assembly 303 may be similar to lens assembly 302.

Lens assembly 302 may include a number of optical layers into which imaging system 216 is distributed, according to an embodiment of the disclosure. Although lens assembly 302 is illustrated with four optical layers, lens assembly 302 may be implemented with more layers or fewer layers, as described below. Lens assembly 302 includes an out-coupling layer 304, an imaging layer 306, an in-coupling layer 308, and a display layer 310, according to an embodiment. As illustrated, out-coupling layer 304 may be positioned closest to eyeward side 206. Out-coupling layer 304 may include out-coupling optical element 224 and intermediate optical element 236. Imaging layer 306 may be positioned between out-coupling layer 304 and in-coupling layer 308. Imaging layer 306 may include image sensor 218. In-coupling layer 308 may include in-coupling optical element 222 and intermediate optical element 234. Intermediate optical element 234 and/or intermediate optical element 236 may alternatively be disposed on imaging layer 306 or in frame 104, according to an embodiment. In-coupling optical element 222, intermediate optical element 234, intermediate optical element 236, and out-coupling optical element 224 of optical structure 220 may each be disposed in their own dedicated optical layer, according to an embodiment. Image sensor 218 may alternatively be disposed in out-coupling layer 304 or in in-coupling layer 308, according to an embodiment. Image sensor 218 may alternatively be carried on a surface of out-coupling layer 304 or on a surface of in-coupling layer 308 to be disposed between two optical layers, according to an embodiment.

Display layer 310 may include waveguide 110A (shown in FIG. 1) to direct display light generated by an electronic display to the eye of the user. In some implementations, at least a portion of the electronic display is included in frame 104 of HMD 300. The electronic display may include an LCD, an organic light emitting diode (OLED) display, micro-LED display, pico-projector, or liquid crystal on silicon (LCOS) display for generating the display light. Waveguide 110A may alternatively be incorporated into one of the other optical layers of lens assembly 302. One or more of the optical layers of lens assembly 302 may also be fabricated to concurrently operate as an illumination layer and/or an optical combiner layer that directs virtual images to an eye of a user, in addition to scene light 212. For example, out-coupling layer 304 may include a plurality of in-field light sources that illuminate the user's eye.

While FIG. 3 illustrates HMD 300 being configured for augmented reality (AR) or mixed reality (MR) contexts, the herein disclosed embodiments of an HMD may also be used in other implementations of an HMD. For example, the optical layers of any of the lens assemblies of this disclosure may be disposed close to a display plane or focusing lens of a virtual reality (VR) HMD.

Figure 4:
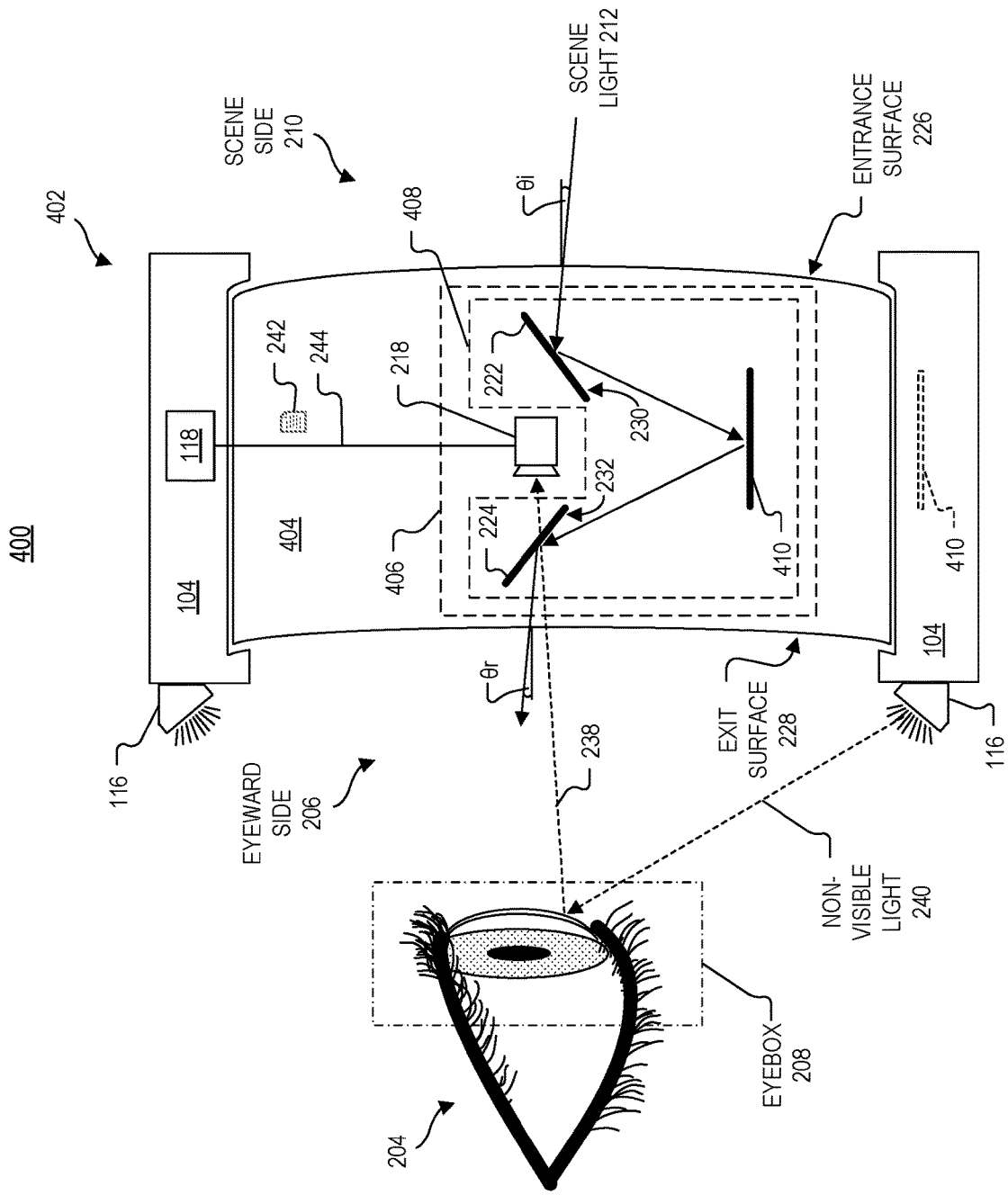
FIG. 4 illustrates an example implementation of a head mounted display in an ocular environment, in accordance with aspects of the disclosure.

FIG. 4 illustrates an ocular environment 400 that includes a cross-sectional side view of an HMD 402, in accordance with embodiments of the disclosure. HMD 402 is an example implementation of HMD 100 (shown in FIG. 1), according to an embodiment. HMD 402 includes lens assembly 404, and lens assembly 404 includes imaging system 406. Imaging system 406 is an example implementation of imaging system 102A (shown in FIG. 1). HMD 402 and imaging system 406 include some similar components of HMD 202 (shown in FIG. 2) and imaging system 216 (shown in FIG. 2), respectively. Imaging system 406 includes an optical structure 408 that has a single intermediate optical element 410. Intermediate optical element 410 receives scene light 212 from in-coupling optical element 222 and directs scene light 212 to out-coupling optical element 224. Intermediate optical element 410 is configured to support directing scene light 212 around image sensor 218, according to an embodiment. Intermediate optical element 410 is a reflective optical device and may be implemented as a mirror and may include one or more dichroic coatings to enable reflection of visible light or all light. As illustrated, intermediate optical element 410 may optionally be positioned in frame 104 or near the outer portion of the field of view of eye 204.

Figure 5:
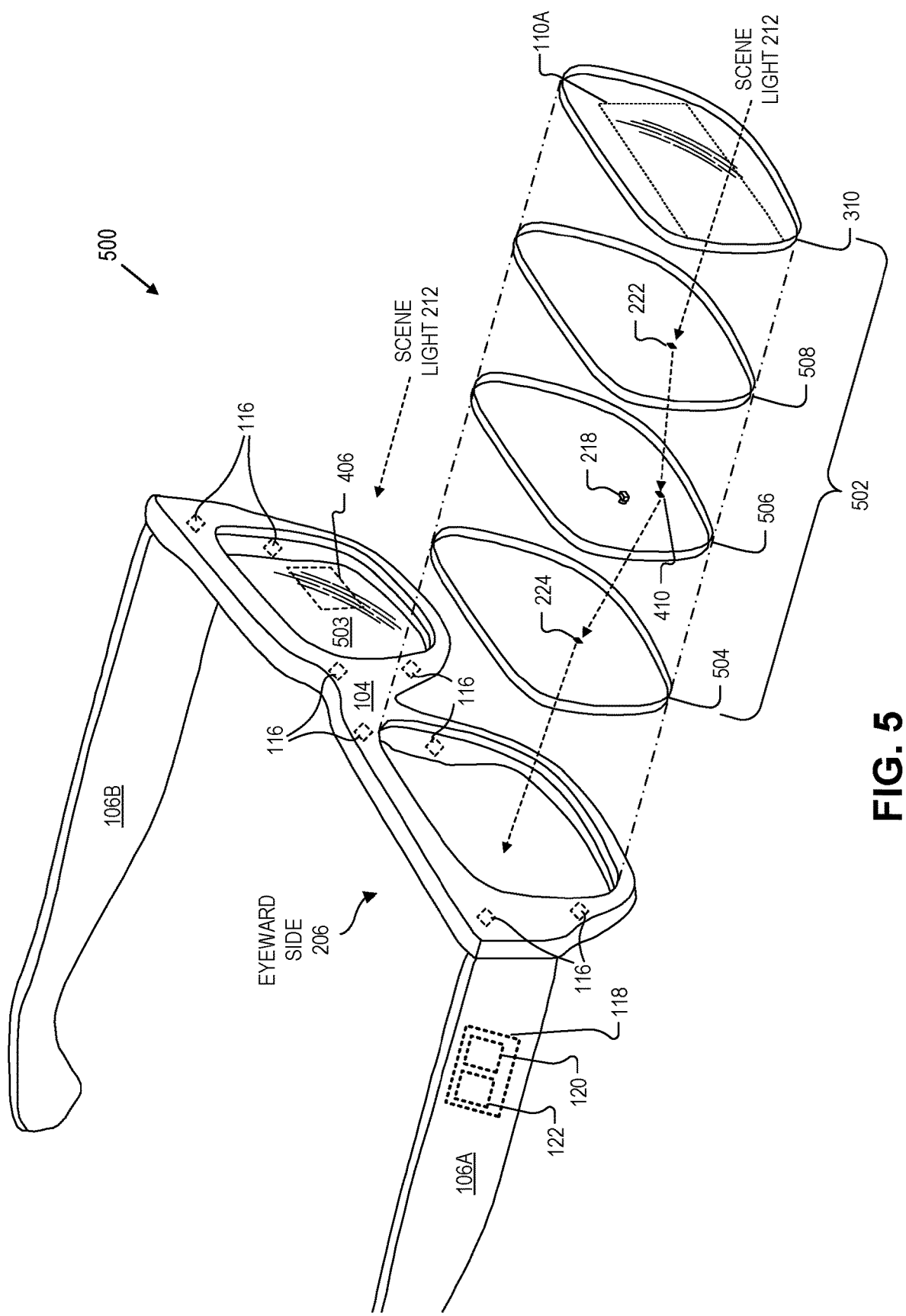
FIG. 5 illustrates a head mounted display, in accordance with aspects of the disclosure.

FIG. 5 illustrates a partially exploded perspective view of an HMD 500, in accordance with embodiments of the disclosure. HMD 500 illustrates an example implementation of HMD 402 (shown in FIG. 4), according to an embodiment. HMD 500 includes a lens assembly 502 and a lens assembly 503. Lens assembly 502 is an illustrative example of an implementation of lens assembly 404 (shown in FIG. 4). Lens assembly 503 may be similar to lens assembly 502.

Lens assembly 502 may include a number of optical layers into which imaging system 406 is distributed, according to an embodiment of the disclosure. Although lens assembly 502 is illustrated with four optical layers, lens assembly 502 may be implemented with more layers or fewer layers, in accordance with various embodiments of the disclosure. Lens assembly 502 includes an out-coupling layer 504, an imaging layer 506, an in-coupling layer 508, and display layer 310 (also shown in FIG. 3), according to an embodiment. As illustrated, out-coupling layer 504 may be positioned closest to eyeward side 206. Out-coupling layer 504 may include (e.g., embedded within, surface mounted, etc.) out-coupling optical element 224. Imaging layer 506 may be positioned between out-coupling layer 504 and in-coupling layer 508. Imaging layer 506 may include image sensor 218 and intermediate optical element 410. In-coupling layer 508 may include in-coupling optical element 222. Intermediate optical element 410 may alternatively be included in out-coupling layer 504 or may be included in in-coupling layer 508, according to an embodiment. In-coupling optical element 222, intermediate optical element 410, and out-coupling optical element 224 of optical structure 408 may each be disposed in their own dedicated optical layer, according to an embodiment. Image sensor 218 may alternatively be disposed in out-coupling layer 504 or in in-coupling layer 508, according to an embodiment. Image sensor 218 may alternatively be carried on a surface of out-coupling layer 504 or on a surface of in-coupling layer 508 to be disposed between two optical layers, according to an embodiment.

Figure 6:
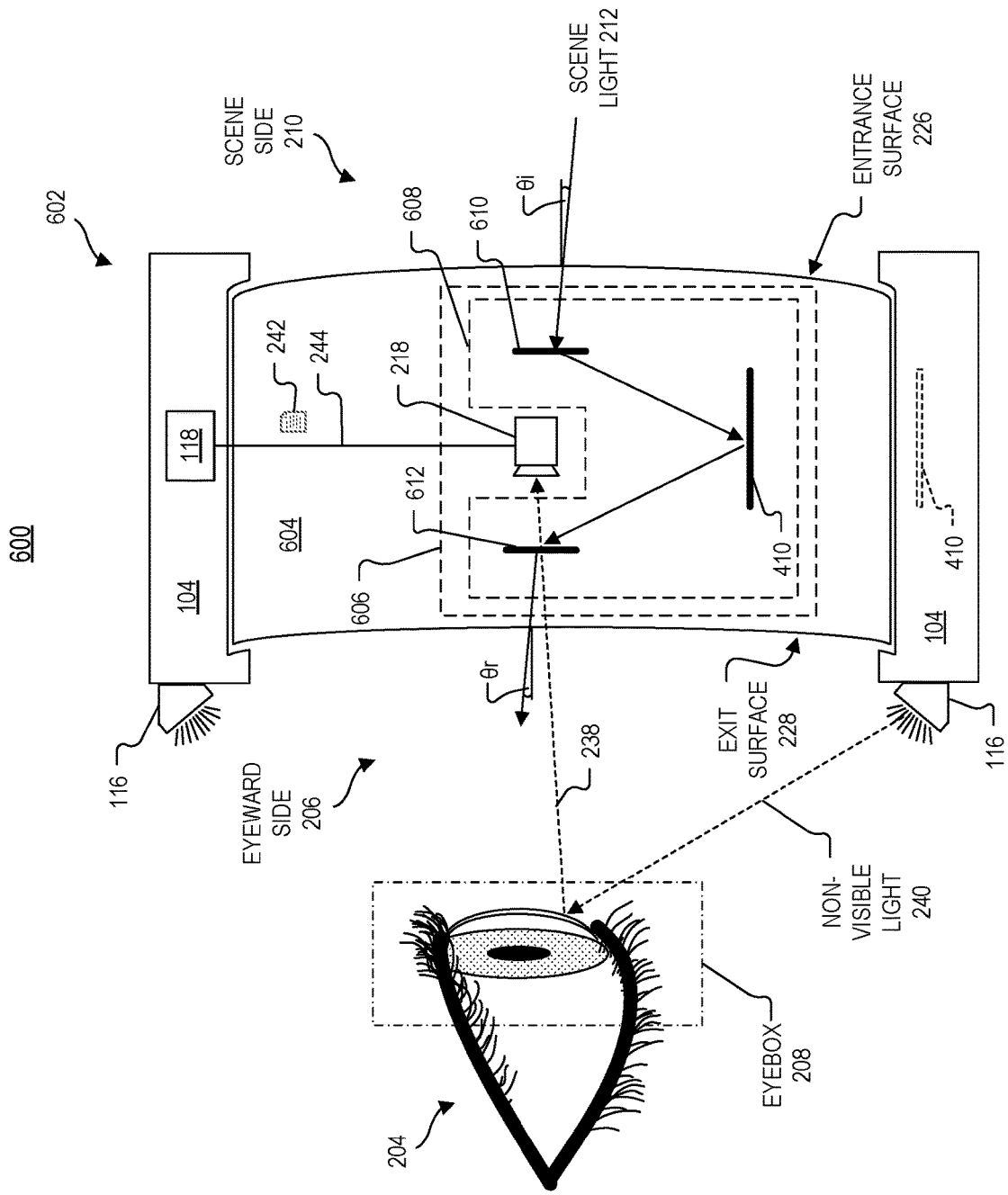
FIG. 6 illustrates an example implementation of a head mounted display in an ocular environment, in accordance with aspects of the disclosure.

FIG. 6 illustrates an ocular environment 600 that includes a cross-sectional side view of an HMD 602, in accordance with embodiments of the disclosure. HMD 602 includes diffractive optical elements that direct scene light 212 around image sensor 218, in accordance with embodiments of the disclosure. HMD 602 is an example implementation of HMD 100 (shown in FIG. 1), according to an embodiment. HMD 602 includes lens assembly 604, which includes imaging system 606. Imaging system 606 is an example implementation of imaging system 102A (shown in FIG. 1). HMD 602 and imaging system 606 include some similar components of HMD 202 (shown in FIG. 2) and imaging system 216 (shown in FIG. 2), respectively, and a similar component as HMD 402 (shown in FIG. 4). Imaging system 606 includes an optical structure 608 that includes intermediate optical element 410, an in-coupling optical element 610, and an out-coupling optical element 612. In-coupling optical element 610 and out-coupling optical element 612 are diffractive optical elements, according to an embodiment. In-coupling optical element 610 and out-coupling optical element 612 may be implemented as diffractive gratings and/or holographic optical elements. In operation, in-coupling optical element 610 receives scene light 212 and directs (e.g., diffracts) scene light 212 to intermediate optical element 410; intermediate optical element 410 receives scene light 212 from in-coupling optical element 610 and directs (e.g., reflects) scene light 212 to out-coupling optical element 612; and out-coupling optical element 612 receives scene light 212 from intermediate optical element 410 and directs (e.g., diffracts) scene light 212 to eyebox 208, to conceal or cloak image sensor 218 from eye 204, according to an embodiment. Out-coupling optical element 612 is configured to transmit or pass reflections 238 to image sensor 218. As illustrated, intermediate optical element 410 may optionally be positioned in frame 104 or near the outer portion of the field of view of eye 204.

Figure 7:
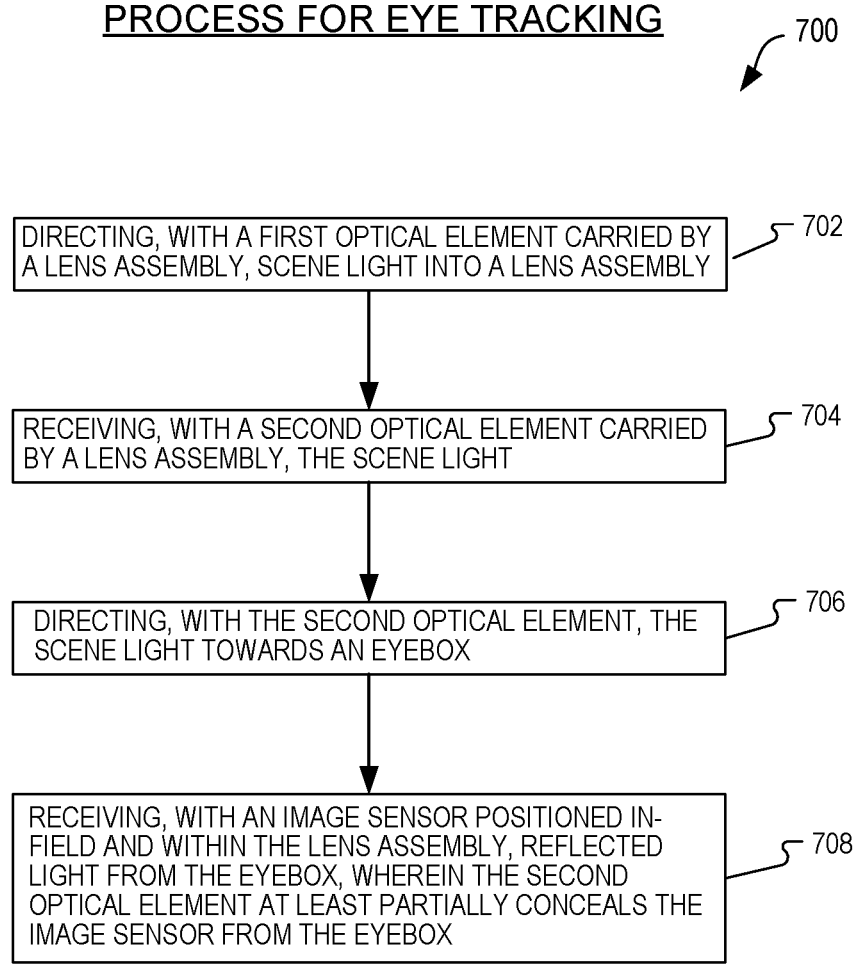
FIG. 7 illustrates a flow diagram of a process for eye tracking, in accordance with aspects of the disclosure.

FIG. 7 illustrates a process 700 for eye tracking, according to an embodiment. Process 700 may be incorporated (e.g., in controller 120) into one or more HMDs disclosed herein. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In process block 702, process 700 directs, with a first optical element carried by a lens assembly, scene light into a lens assembly, according to an embodiment. Process block 702 may proceed to process block 704, according to an embodiment.

In process block 704, process 700 receives, with a second optical element carried by a lens assembly, the scene light, according to an embodiment. Process block 704 may proceed to process block 706, according to an embodiment.

In process block 706, process 700 directs, with the second optical element, the scene light towards an eyebox, according to an embodiment. Process block 706 may proceed to process block 708, according to an embodiment.

In process block 708, process 700 receives, with an image sensor positioned in-field and within the lens assembly, reflected light from the eyebox, wherein the second optical element at least partially conceals the image sensor from the eyebox, according to an embodiment.

The first optical element and the second optical element are configured to conceal or cloak the image sensor from a user's eye within the eyebox, according to an embodiment. The first and second optical elements are configured to direct scene light around the image sensor and to the eyebox. Process 700 may also include illuminating the eyebox with, for example, infrared light to enable the image sensor to receive reflections from the user's eye. The reflections are converted to electrical signals represented by image data, which may be used to track and determine an orientation of a user's eye. The orientation of the user's eye may be used by the disclosed HMDs to provide user interface options, adjust the focus of user interface elements, or otherwise provide a custom interactive experience to the user, for example.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g., controller 118, processing logic 120) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., memories 122) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eye tracking system comprising
   a lens assembly having a scene side and an eyebox side;
   an image sensor positioned within the lens assembly to capture reflected light that is reflected from the eyebox;
   a first optical element carried by the lens assembly and configured to at least partially direct scene light around the image sensor, wherein the first optical element is positioned between the image sensor and the scene side of the lens assembly; and
   a second optical element carried by the lens assembly and positioned to at least partially conceal the image sensor from an eye in the eyebox, wherein the second optical element is configured to receive the scene light and direct the scene light towards the eye, wherein the second optical element is positioned between the image sensor and the eyebox side of the lens assembly, wherein the second optical element includes a dichroic layer configured to reflect visible wavelengths of the scene light towards the eyebox, wherein the dichroic layer is configured to transmit at least some non-visible wavelengths of the reflected light from the eyebox to the image sensor.

2. The eye tracking system of claim 1, wherein the image sensor, the first optical element, and the second optical element are inside the lens assembly.

3. The eye tracking system of claim 1, wherein the lens assembly includes a plurality of optical layers physically coupled together.

4. The eye tracking system of claim 1 further comprising at least one intermediate optical element.

5. The eye tracking system of claim 4, wherein the at least one intermediate optical element includes a reflective optical element optically positioned between the first optical element and the second optical element to direct the scene light to the second optical element from the first optical element.

6. The eye tracking system of claim 5, wherein the lens assembly includes a first layer, a second layer, and a third layer, wherein the image sensor is positioned within the second layer.

7. The eye tracking system of claim 4, wherein the at least one intermediate optical element includes a third optical element and a fourth optical element, wherein the third optical element is configured to receive the scene light from the first optical element and direct the scene light to the fourth optical element, wherein the fourth optical element is configured to receive the scene light from the third optical element and direct the scene light to the second optical element.

8. The eye tracking system of claim 7, wherein the lens assembly include a first layer, a second layer, and a third layer, wherein the image sensor is positioned within the second layer, wherein the first optical element is positioned within the first layer and the second optical element is positioned within the third layer.

9. The eye tracking system of claim 1, wherein the first optical element is a diffractive optical element.

10. The eye tracking system of claim 1, wherein the image sensor is configured to capture infrared light that is reflected from the eye.

11. The eye tracking system of claim 1 further comprising a controller communicatively coupled to the image sensor, wherein the controller is configured to receive image data from the image sensor, wherein the controller is configured to at least partially determine an orientation of the eye based on the image data.

12. A head mounted display comprising:
    a lens assembly that transmits scene light to an eyebox, wherein the lens assembly include a scene side and an eyebox side;
    a frame that carries the lens assembly and that positions the lens assembly near the eyebox; and
    an eye tracking system including:
       an image sensor positioned in-field to the eyebox and within the lens assembly, wherein the image sensor receives reflected light that is reflected from the eyebox; and
       an optical element carried by the lens assembly, wherein the optical element receives scene light and directs the scene light towards the eyebox and around the image sensor,
       wherein the optical element is positioned between the eyebox and the image sensor to at least partially conceal the image sensor from the eyebox,
       wherein the optical element is a diffractive optical element configured to direct scene light towards the eyebox and transmit infrared wavelengths of the reflected light to the image sensor.

13. The head mounted display of claim 12 further comprising a plurality of light sources carried by the frame, wherein the plurality of light sources are directed towards the eyebox, wherein the plurality of light sources emit light in a non-visible wavelength.

14. The head mounted display of claim 12 further comprising a controller communicatively coupled to receive image data from the image sensor, wherein the controller at least partially determines an orientation of the eye at least partially based on the image data.

15. A method of eye tracking comprising:
    directing, with a first optical element carried by a lens assembly, scene light into a lens assembly and around an image sensor positioned within the lens assembly;
    receiving, with a second optical element carried by theft lens assembly, the scene light;
    directing, with the second optical element, the scene light towards an eyebox;
    transmitting, through the second optical element, infrared reflected light from the eyebox to the image sensor, wherein the second optical element is positioned between the eyebox and the image sensor; and
    receiving, with the image sensor, the reflected light from the second optical element,
    wherein the second optical element includes a dichroic layer configured to redirect the scene light and transmit the reflected light to at least partially conceal the image sensor from an eye in the eyebox.

16. The method of claim 15 further comprising:
    emitting, with a light source, non-visible light towards the eyebox; and determining an orientation of the eye at least partially based on the reflected light received from the eyebox.

\* \* \* \* \*